W. C. MEYER.
INSEAM SHOE SEWING MACHINE.
APPLICATION FILED JUNE 22, 1910.

1,059,380.

Patented Apr. 22, 1913.

Witnesses:
E. C. Wurdeman
M. L. Gilman

Inventor:
William C. Meyer
by his Attorneys
Phillips Van Everen & Fish

W. C. MEYER.
INSEAM SHOE SEWING MACHINE.
APPLICATION FILED JUNE 22, 1910.

1,059,380.

Patented Apr. 22, 1913.

Witnesses:
E. C. Wurdeman
M. L. Gilman

Inventor:
William C. Meyer
by his Attorneys
Phillips Van Everen & Fish

W. C. MEYER.
INSEAM SHOE SEWING MACHINE.
APPLICATION FILED JUNE 22, 1910.

1,059,380.

Patented Apr. 22, 1913.
7 SHEETS—SHEET 7.

Witnesses
Inventor:
William C. Meyer
by his Attorneys
Phillips Van Everen & Fish

UNITED STATES PATENT OFFICE.

WILLIAM C. MEYER, OF BOSTON, MASSACHUSETTS, ASSIGNOR TO UNITED SHOE MACHINERY COMPANY, OF PATERSON, NEW JERSEY, A CORPORATION OF NEW JERSEY.

INSEAM SHOE-SEWING MACHINE.

1,059,380.  Specification of Letters Patent.  Patented Apr. 22, 1913.

Application filed June 22, 1910. Serial No. 568,248.

*To all whom it may concern:*

Be it known that I, WILLIAM C. MEYER, a citizen of the United States, residing at Boston, in the county of Suffolk and State of Massachusetts, have invented certain new and useful Improvements in Inseam Shoe-Sewing Machines; and I do hereby declare the following to be a full, clear, and exact description of the invention, such as will enable others skilled in the art to which it appertains to make and use the same.

The present invention relates to inseam shoe sewing machines and is intended primarily as an improvement in inseam shoe sewing machines of that class which form a chain stitch, and which are provided with a curved hook needle and with a stitch setting take-up operating to exert a stitch setting strain on the seam while the needle is in the work. It is to be understood, however, that certain features of the present invention are equally applicable to other types of inseam shoe sewing machines and that except as defined in the claims, the several features of the present invention are not limited to use of any particular type of inseam shoe sewing machine.

The object of the present invention is to produce a smooth and light running inseam shoe sewing machine which is capable of being operated at a high rate of speed and which has its various operating and thread-controlling parts constructed and arranged in an improved manner so that an even and tight seam can be produced when the machine is running at high speed without liability of injury to the shoe and without displacing the parts of the shoe being operated upon or disturbing the shoe so as to render its manipulation by the operator difficult.

With the above object in view the present invention consists in the constructions, combinations, and arrangements of parts hereinafter described and claimed, the advantages of which will be obvious to those skilled in the art from the following description.

The several features of the present invention will be clearly understood from an inspection of the accompanying drawings illustrating a machine embodying the same in their preferred form.

The machine illustrated in the drawings is a welt shoe sewing machine adapted to sew the welt to the upper and insole of a lasted shoe. The principal parts of the machine are a curved hook needle entering the shoe from the outside so that the chain of the seam of stitches is laid on the welt; a curved awl entering the channel of the shoe; a thread arm, a looper, a take-up, an auxiliary take-up, a tension device, a channel guide and a welt guide. These parts have the same general mode of operation as the corresponding parts in the well-known Goodyear welt and turn shoe sewing machine, the construction and mode of operation of which is disclosed with substantial accuracy in the patent to French and Meyer, No. 412,704. The thread finger and looper, however, are arranged to coöperate with the needle to cause the needle to draw through the work what is known in the art as a straight loop instead of a twisted loop and the tension device is arranged to exert a comparatively light tension on the thread during the loop-drawing stroke of the needle and a comparatively heavy tension during the stitch setting stroke of the take-up. The machine is also provided with a tension governor similar to that disclosed in applicant's prior application, No. 515,673, filed September 1, 1909, by which the tension on the thread is automatically varied with any change in the speed of the machine.

Figure 4:
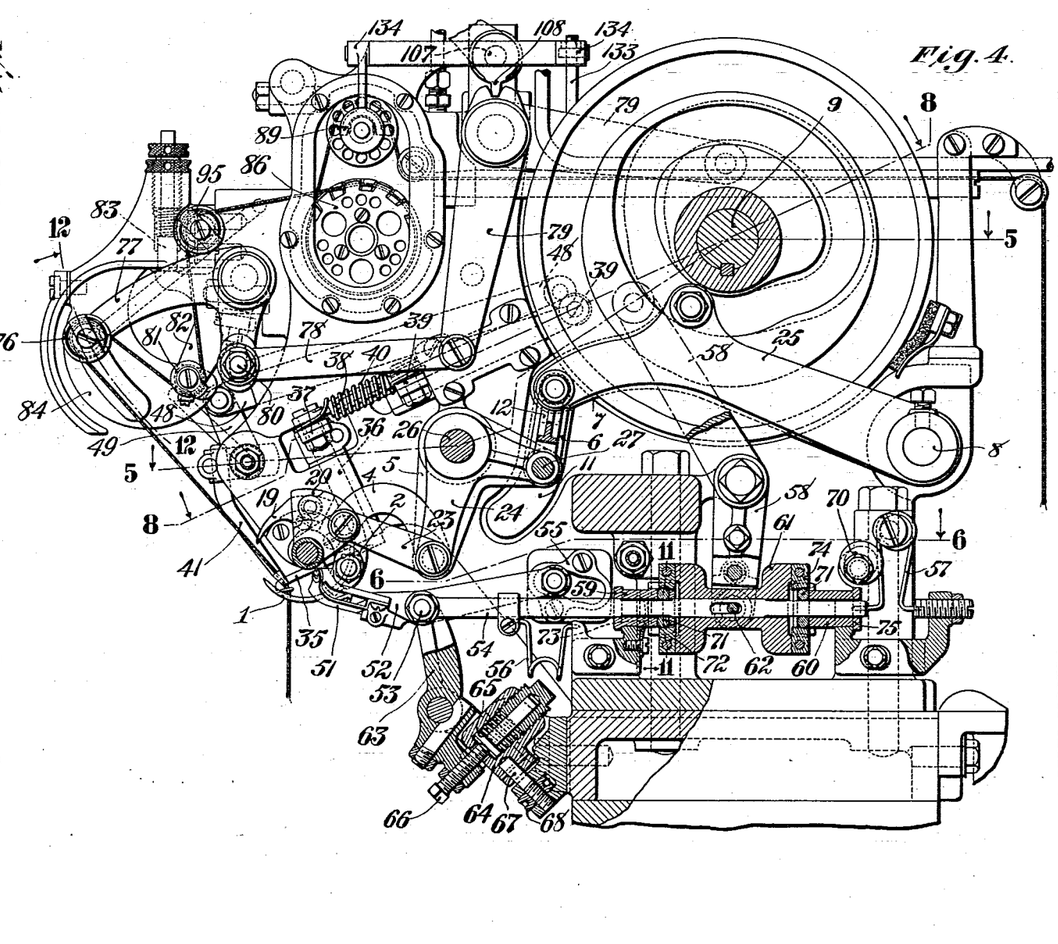
Fig. 4 is a longitudinal sectional elevation of the machine taken on the line 4—4, of Fig. 1.
Figure 5:
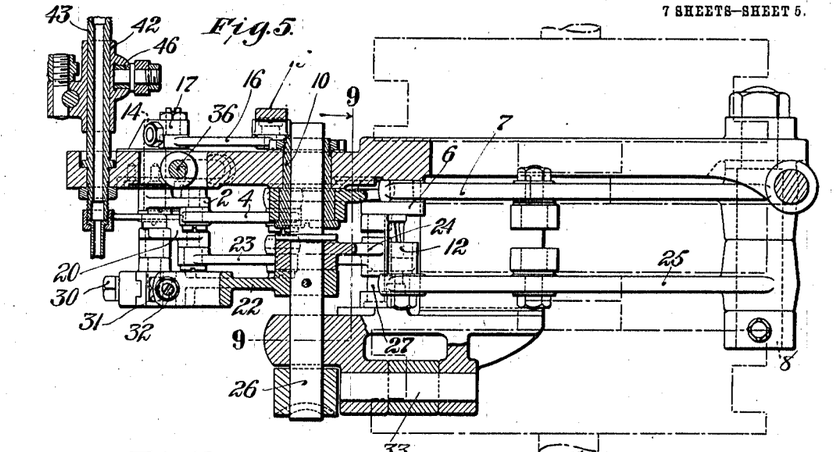
Fig. 5 is a detail sectional view taken on the line 5—5 of Fig. 4.
Figure 6:
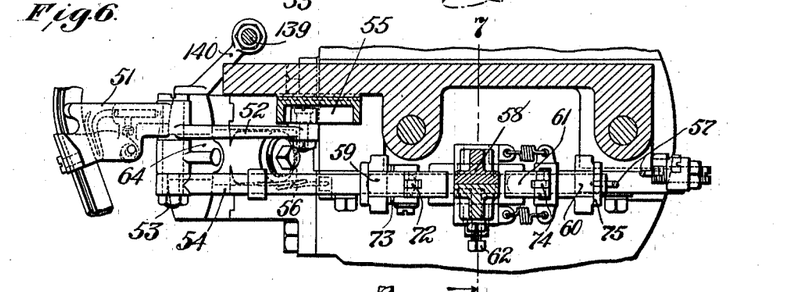
Fig. 6 is a detail sectional view taken on the line 6—6 of Fig. 4.

Referring to the drawings, and particularly to Figs. 4, 5, 9 and 10, 1 indicates the curved hook needle secured in the usual manner to a needle carrier 2 mounted to oscillate upon a bearing stud 3. The needle carrier 2 is connected by means of a link 4 to the vertical arm of a bell crank 5, the horizontal arm of which is connected by a link 6 to a lever 7 pivoted at 8 at the rear of the machine frame and operated by a cam groove in a cam disk on the main shaft 9 of the machine. The bell crank 5 is mounted upon a hollow stud 10 rigidly secured in the frame of the machine as indicated in Fig. 5, and its hub is securely held against lateral displacement between the enlarged head of the stud and a bearing surface on the machine frame. The horizontal arm of the bell crank 5 at the point at which it connects with the link 6 has a sliding engagement with a flat surface 11 on the machine frame which forms a lateral thrust bearing for one side of the arm. The cam actuated lever 7 at the point at which it is connected to the link 6 also bears against the surface 11 so that this surface forms a lateral thrust bearing both for the horizontal arm of the bell crank 5 and for the end of the cam actuated lever 7. The link 6 has a sliding engagement with a link or cross-head 12 forming a part of the awl actuating mechanism to be hereinafter described so that the cross-head forms a lateral thrust bearing for the link which is opposed to the surface 11. The link 6 and the ends of the bell crank 5 and lever 7 connected to the link, are thus confined between lateral thrust bearings and can be operated smoothly and accurately at a high rate of speed.

Figure 3:
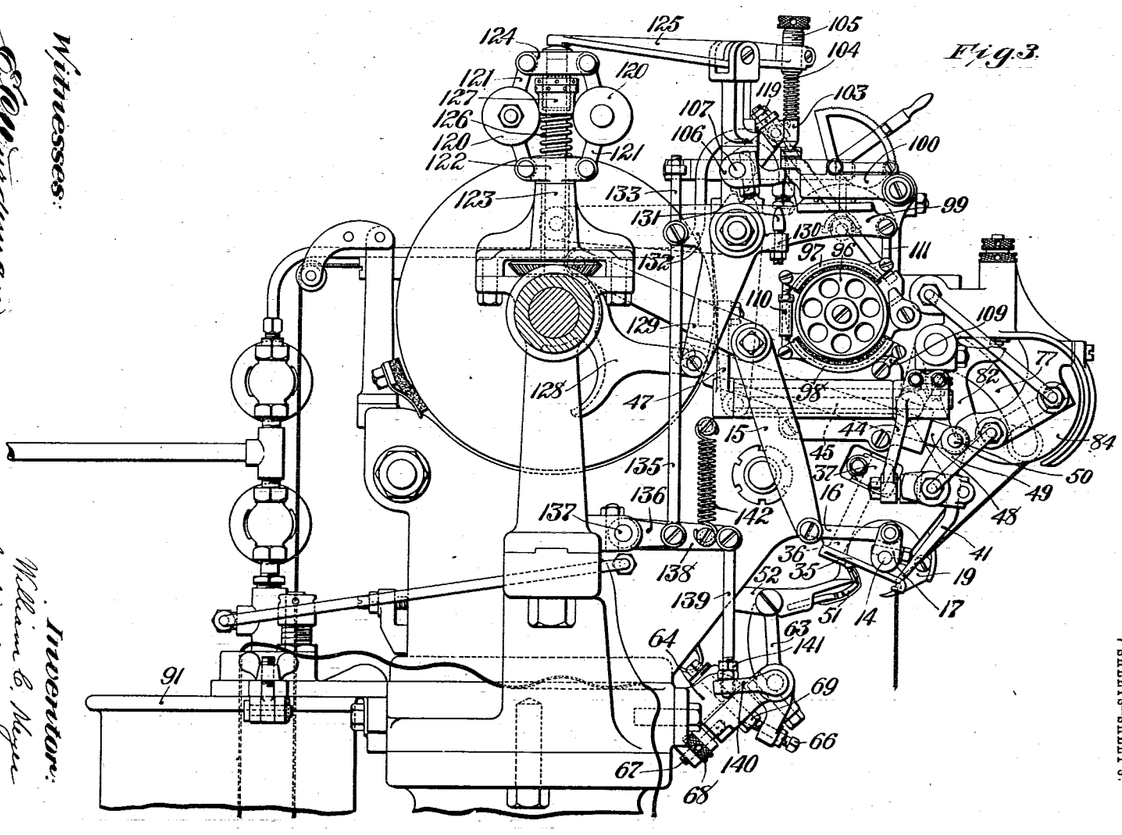
Fig. 3 is a side elevation of the machine partly in section looking in the opposite direction from Fig. 2.
Figure 10:
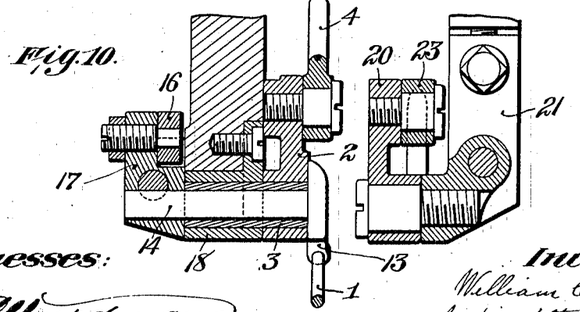
Fig. 10 is a detail sectional view taken on a plane passing through the axes of the needle and awl carriers.
Figure 11:
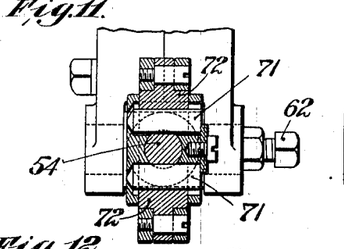
Fig. 11 is a detail sectional view taken on the line 11—11 of Fig. 4.
Figure 12:
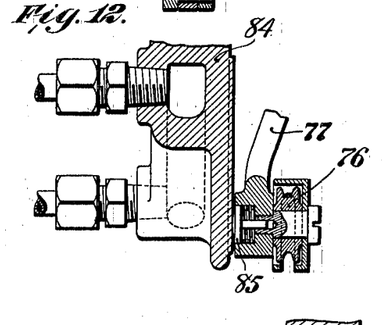
Fig. 12 is a detail sectional view taken on the line 12—12 of Fig. 4.
Figures 13, 14:
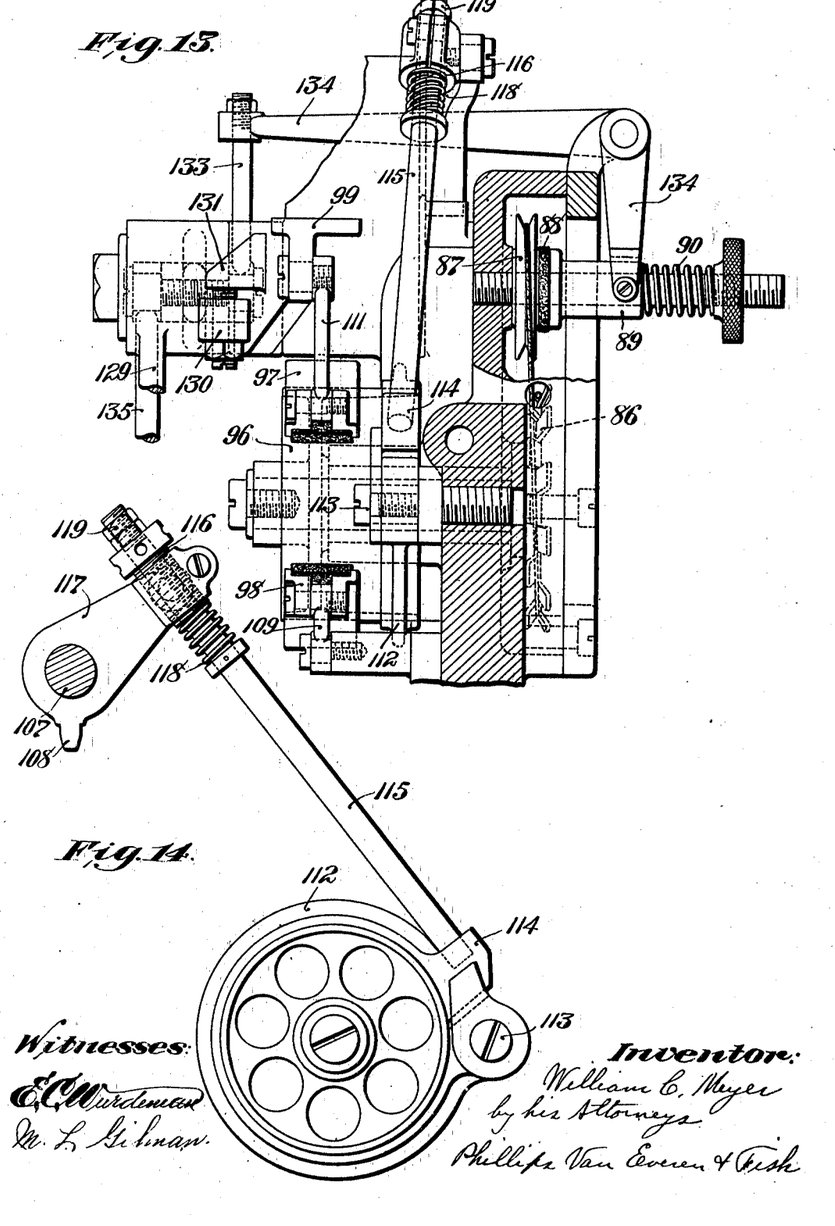
Fig. 13 is a detail view partly in section of a portion of the thread tension mechanism.
Fig. 14 is a detail view in side elevation of the brake for locking the tension when the take-up reaches the limit of its upward stroke.

The needle guide indicated at 13 is of well-known construction and is secured to or formed integral with a short shaft 14 journaled in the hollow stud 3 upon which the needle carrier 2 is mounted. The needle guide is actuated positively from a cam on the main shaft of the machine through a cam actuated lever 15, (see Fig. 3) and a link 16 connecting the lower end of the lever and an arm 17 secured to the outer end of the shaft 14. The hollow stud 3 forms a bearing both for the needle carrier and for the shaft of the needle guide. To enable this hollow stud to be readily replaced when it becomes worn, it is mounted in a block 18 removably secured to the frame of the machine, as indicated in Fig. 10.

Figure 9:
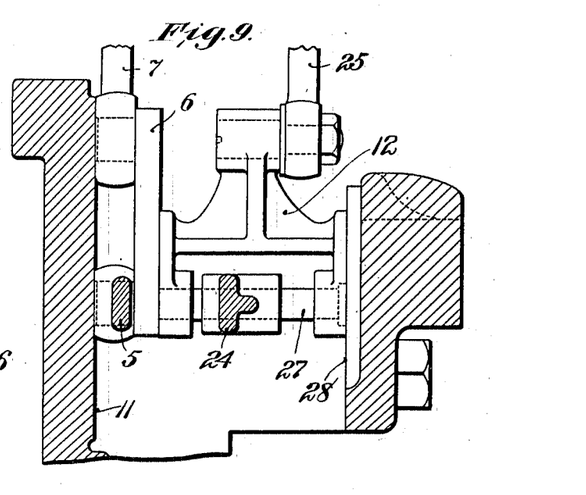
Fig. 9 is a detail sectional view taken on the line 9—9 of Fig. 5.

The awl 19 of the machine illustrated in the drawings, is curved in the arc of a circle of slightly smaller radius than that of the needle and is mounted to oscillate on an axis slightly below and at the rear of the axis of the needle. The awl is clamped to an awl carrier 20 which is pivotally mounted upon a stud projecting from a block 21. This block is mounted upon the laterally movable feed member or lever 22 hereinafter described by which lateral movements are imparted to the awl to feed the work. The awl carrier 20 is connected by means of a link 23 (see Figs. 4, 5 and 10) to the vertical arm of a bell-crank lever 24, the horizontal arm of which is connected by the link 12 to a cam actuated lever 25. The bell crank 24 is mounted concentric with the bell crank 5 upon the pivot stud 26 of the feed lever hereinafter described and its hub is confined between a collar on the stud and a bearing surface on the feed lever. The pivot stud 26 is pinned to the feed lever 22 and moves laterally therewith. The bell crank 24, link 23, and awl carrier 20 thus all move laterally with the feed lever. To permit this lateral movement of the bell crank 24, the link 12 connecting the horizontal arm of the bell crank with the cam actuated lever 25 is in the form of a crosshead, as illustrated in Fig. 9, and is provided with a pin 27 having a sliding engagement with the horizontal arm of the bell crank. The link 12 at one side engages the link 6 of the needle actuating mechanism as has been described, and on the other side engages a flat surface 28 on the machine frame which forms a lateral thrust bearing for this side of the link. The link 12 is thus supported against lateral thrust on one side by the link 6 and on the other side by the surface 28, so that it can be operated smoothly at a high rate of speed without danger of cramping the connection between the link and the laterally movable bell crank 24.

The channel guide, indicated at 29, is shaped and arranged to engage the channel of the shoe sole in the usual manner and has substantially the same movements as the channel guide of the machine disclosed in the patent to French and Meyer, hereinbefore referred to, that is, it is mounted to move with the awl during the feed and also has a movement toward and from the shoe. The channel guide is secured to the block 21 upon which the awl is mounted by means of a screw 30 passing through a vertical slot in the guide, so that the channel guide can be adjusted vertically to bring its work engaging edge into the desired position with relation to the path of the needle. The block 21 is secured to the feed lever 22 by means of a screw 31 passing through a vertical slot in the block to permit a vertical adjustment of the awl carrier. As a means for adjusting the block 21 vertically, an adjusting screw 32 is provided which has a screw threaded engagement with the lever 22 and bears against the top of the block 21. An adjustment of the block 21 adjusts both the awl and channel guide with relation to the needle but does not change their positions with relation to each other. The adjustable connection between the channel guide and the block 21 permits a relative adjustment of the channel guide and awl when desired.

The feeding member 22 is mounted so as to be capable of moving laterally to actuate the awl and channel guide to feed the work and to return these parts to their initial position after the work is fed. To this end the pivot stud 26 of the feeding member is mounted to slide through a projection on the frame of the machine and through the hollow stud 10 which forms the bearing for the bell crank 5 of the needle actuating mechanism. This construction is best shown in Fig. 5. The lateral movements are imparted to the feeding member by means of an actuating lever 33, the lower end of which is pivoted to the frame of the machine and the upper end of which is arranged to engage a peripheral cam groove in a cam disk on the main driving shaft. The connection between the lever 33 and the feeding member 22 consists of a pin 34 which is clamped in a slot in the feeding member and extends into a slot in the lever. By adjusting the pin in the slots the length of the feeding movements imparted to the feeding member may be varied as desired. To impart a slight inward and outward movement to the channel guide so as to cause it to release the work upon its return movement, the feeding member 22 is extended upwardly above the pivot stud 26 and is arranged to be engaged directly by a cam on the main driving shaft.

Figure 8:
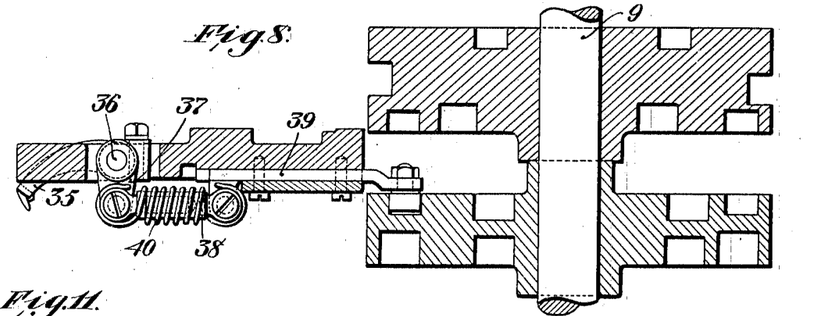
Fig. 8 is a detail sectional view taken on the line 8—8 of Fig. 4.

The thread arm of the machine is indicated at 35. This arm is secured to the lower end of a shaft 36 mounted in the frame of the machine at a slight inclination to the vertical. At its upper end the shaft 36 is provided with a laterally extending arm 37 (see particularly Fig. 8) which is connected by means of a link 38 to a cam actuated slide 39 mounted in the frame of the machine. In the operation of inseam shoe sewing machines of the type illustrated in the drawings, the needle guide is sometimes pushed forward, in case the needle breaks, into the path of movement of the thread arm and as a consequence the thread arm or the needle guide is injured by the engagement of the arm with the guide. To obviate this difficulty the thread arm actuating mechanism of the machine illustrated in the drawings is provided with a yielding connection strong enough to operate the thread arm properly in the normal operation of the machine but capable of yielding in case the thread arm meets with any obstruction. As illustrated in Fig. 8 this yielding connection is formed by making the link 38 in two parts which are held together by a spring 40 coiled around the link and connected at its ends to the pivotal connections of the link.

The looper is indicated at 41 and consists of an arm pinned at its upper end to a block or sleeve 42 mounted to slide laterally and oscillate on a hollow stud 43 secured to the frame of the machine, as illustrated in Fig. 5. Lateral sliding movements are imparted to the block 42 by means of an arm 44 (see Fig. 3) secured at the forward end of a horizontal rock shaft 45 provided at its lower end with a swivel block 46 engaging a vertical slot in the block 42. This block and slot connection permits the block 42 to be oscillated without interfering with the mechanism which imparts the lateral sliding movements to the block. The rear end of the rock shaft 45 is provided with an arm 47 which engages a cam on the main driving shaft. Oscillating movements are imparted to the block 42 by means of a cam actuated slide 48, the rear end of which directly engages a cam on the driving shaft and the forward end of which is pivotally connected to an arm 49 projecting upwardly from the block 42. To permit the block 42 to be moved laterally without interfering with the mechanism by which it is oscillated, the connection between the slide 48 and the arm 49 consists of a pin 50 carried by the slide and arranged to slide in the arm. The hollow stud 43 upon which the block 42 is mounted provides a steam chamber intimately associated with the block 42 and the looper carried thereby. The hollow stud therefore constitutes a simple and efficient means for heating the looper in a satisfactory manner.

Figure 1:
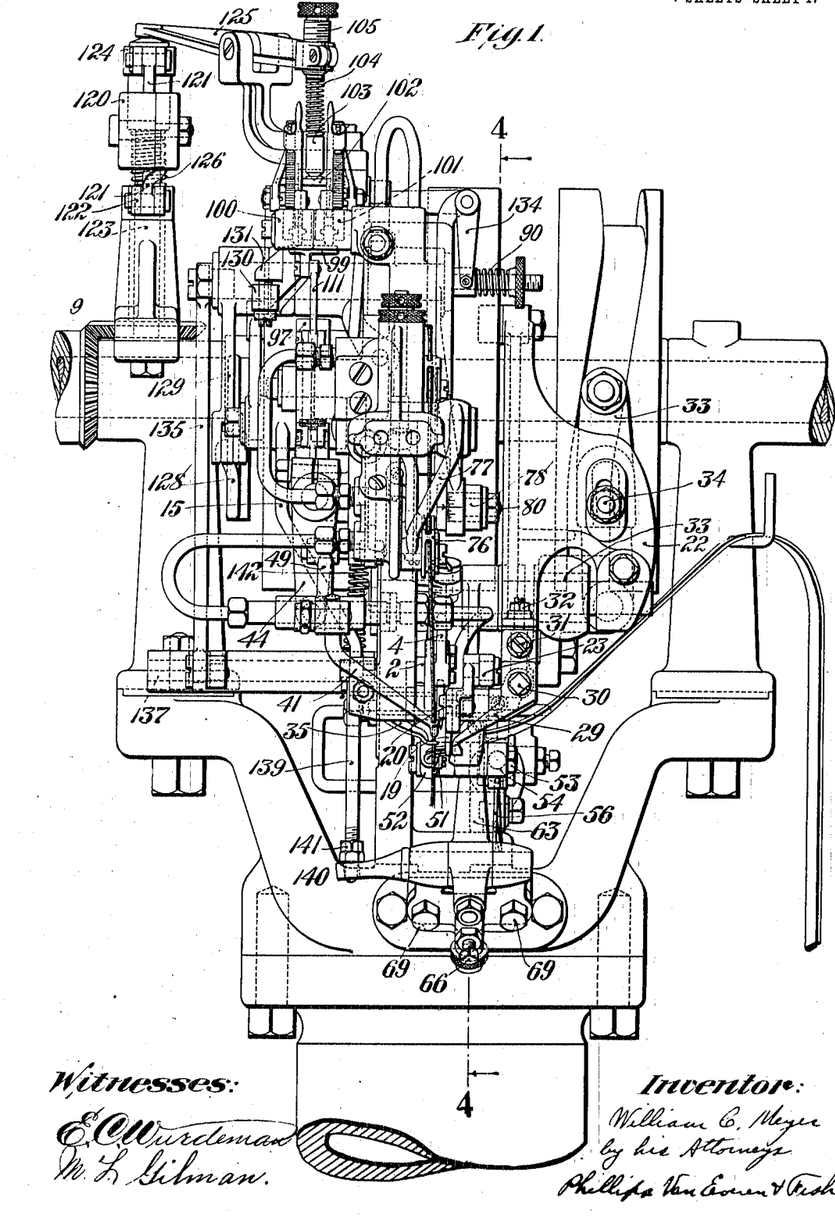
Figure 1 of the drawings is a view in front elevation of the machine.
Figure 7:
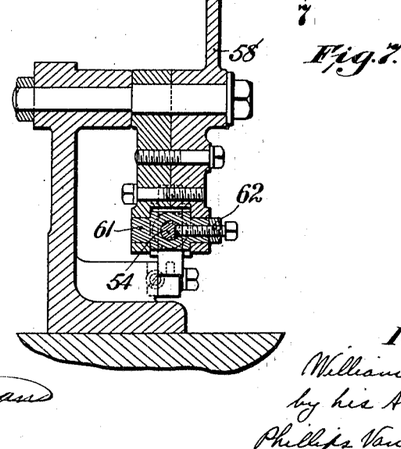
Fig. 7 is a detail cross sectional view taken on the line 7—7 of Fig. 6.

The welt guide, indicated at 51, comprises the usual parts for supporting and guiding the welt. This guide is mounted upon the forward end of an arm 52 pivoted at 53 upon the forward end of the welt guide slide 54. At its rear end the arm 52 is provided with a roll engaging a cam groove in a plate 55 secured to the frame of the machine, the shape of the groove being such that an oscillating movement is imparted to the arm 52 as the slide 54 is advanced and retracted. This oscillating movement of the arm 52 causes the portion of the welt guide in proximity to the needle to move in a path which practically coincides with the path of the needle so that the welt is always positioned with relation to the needle regardless of the thickness of the work being operated upon. The slide 54 is advanced and retracted to move the welt guide toward and from the shoe and is locked in its advanced position during each cycle of operations of the machine by means of two springs 56 and 57, a cam actuated lever 58, two clutch boxes 59 and 60 and a clutch actuating block 61 pivotally mounted on the lower end of the lever 58. The clutch boxes 59 and 60 and the clutch actuating block 61 are all mounted upon the rod and the rod is supported by means of a screw threaded pin 62 arranged axially of the pivotal connection between the clutch actuating block 61 and lever 58 and projecting into a slot in the rod. This construction is best shown in Figs. 4 and 7. The forward end of the rod 54 is pivotally supported at the upper end of an arm 63 pivotally mounted in a block 64 secured to the frame of the machine. The slide 54 is thus supported at two points, in a substantially frictionless manner so that it responds quickly to its actuating mechanism and can be moved with certainty into and out of engagement with the shoe at the proper times during each cycle of operations of the machine. The welt guide slide 54 is light as compared with slides which have heretofore been used and the manner in which it is mounted and actuated enables it to be operated in perfect timed relation to the other parts of the machine when the machine is running at high speed. To form a yielding stop for the welt guide slide when no work is in the machine, a spring-pressed plunger 65 is mounted in the block 64 and is arranged to be engaged by an adjustable stop screw 66 mounted in the lower end of the arm 63. To enable the position of the welt guide to be adjusted with relation to the path of the needle the block 64 is mounted in the frame of the machine so as to be capable of vertical adjustment. The block is adjusted by means of a screw threaded pin 67 (see Fig. 4) which is secured to the block 64 and which is engaged by an adjusting nut 68 seated in a slot in the machine frame. The block 64 is held in adjusted position by locking bolts 69 (see Fig. 1).

To advance the welt guide slide 54 so as to bring the welt guide 51 into engagement with the shoe, the springs 56 and 57 are utilized. Both of these springs act on the slide during the first portion of its advancing movement but after the welt guide has nearly reached the shoe, the spring 57 is thrown out of operation and the movement of the guide is continued by the spring 56. The spring 56 is light as compared with the spring 57 and thus the final movement of the welt guide against the shoe is produced by a comparatively light pressure and does not tend to disturb the shoe in the hands of the operator or "knock it down" when the welt guide engages the shoe. To throw the spring 57 out of operation during the advancing movement of the slide 54, an adjustable eccentric pin 70 is provided which forms a stop for one side of the spring, as is clearly shown in Fig. 4.

The mechanism for locking the welt guide in its advanced position and for retracting the welt guide, comprises the clutch boxes 59 and 60 and the clutch actuating block 61. The clutch box 59 is provided with clutch rolls 71 which are arranged to be engaged by inclined surfaces or blocks 72 mounted in the clutch actuating block 61. These rolls rest against flat surfaces formed on the rod 54 and are forced against these surfaces to clutch the rod and lock the rod in its advanced position when the block 61 is moved toward the left as viewed in Fig. 4. To cause the rolls to securely grip the rod and to avoid undue strain or breakage of the parts, the clutch box 71 is mounted so as to have a slight longitudinal movement with the rod. To this end the clutch box is provided with a peripheral groove which is engaged loosely by a projection from the frame of the machine. The clutch box is acted upon by a leaf spring 73 which tends to force the box toward the rear of the machine and hold it in the position, indicated in Fig. 4. When the clutch box is actuated by the block 61 to grip the slide 54, it can move forward a short distance and thus insure accuracy in the operation of the clutch rolls and avoid breakage of any of the parts. This forward movement of the clutch box 59 also imparts a slight positive forward movement to the welt guide which gives a final positive squeeze to the work just before the welt guide is locked. The clutch box 60 is utilized in retracting the welt guide. This clutch box is provided with clutch rolls arranged in the same manner as the clutch rolls 71 of the box 59 and adapted to be engaged by the inclined surfaces of blocks 74 mounted in the opposite end of the block 61 from the blocks 72. The clutch box 60 is mounted to move longitudinally of the rod 54 and its forward movement is limited by the engagement of a shoulder 75 on the box with a projection on the machine frame.

The take-up comprises a thread truck 76 mounted upon one arm of a bell crank 77. The other arm of the bell crank 77 is connected by a link 78 to a cam actuated bell crank 79. The take-up performs the same function as the take-up of the machine disclosed in the patent to French and Meyer hereinbefore referred to, that is, it exerts a stitch setting strain on the seam while the needle is in the work and also acts to pull thread from the supply for the succeeding stitch. In its downward movement the take-up delivers thread to the needle during the retracting stroke of the needle. It is desirable in this type of machine that the needle pull the thread taut as it reaches the limit of its backward movement. To regulate the amount of needle pull on the thread, the machine illustrated in the drawings is provided with means whereby the thread delivering or down stroke of the take-up may be varied and to this end the bell crank 77 is connected to the link 78 by a pin 80 which projects through a slot in the bell crank. This slot is so arranged that an adjustment of the pin 80 varies the point to which the thread truck 76 descends without producing any substantial change in the point to which the truck ascends. It will be obvious that when the downward stroke of the take-up is increased the pull by the needle on the thread will be decreased and that when the downward stroke of the take-up is decreased the pull of the needle on the thread will be increased.

The auxiliary take-up, indicated at 81, is mounted on a bell crank 82 which is pivotally mounted concentric with the main take-up lever. One arm on the bell crank 82 is arranged to engage a spring-pressed plunger 83 when the auxiliary take-up is raised. The auxiliary take-up has the same mode of operation as the auxiliary take-up of the French and Meyer patent.

To heat the take-up 76 a hollow steam-heated plate 84 is provided at one side of the take-up lever 77. This plate is provided with a flat surface which is engaged by a spring-pressed plunger 85 mounted in the lever 77 in line with the axis of the take-up truck 76.

Figure 2:
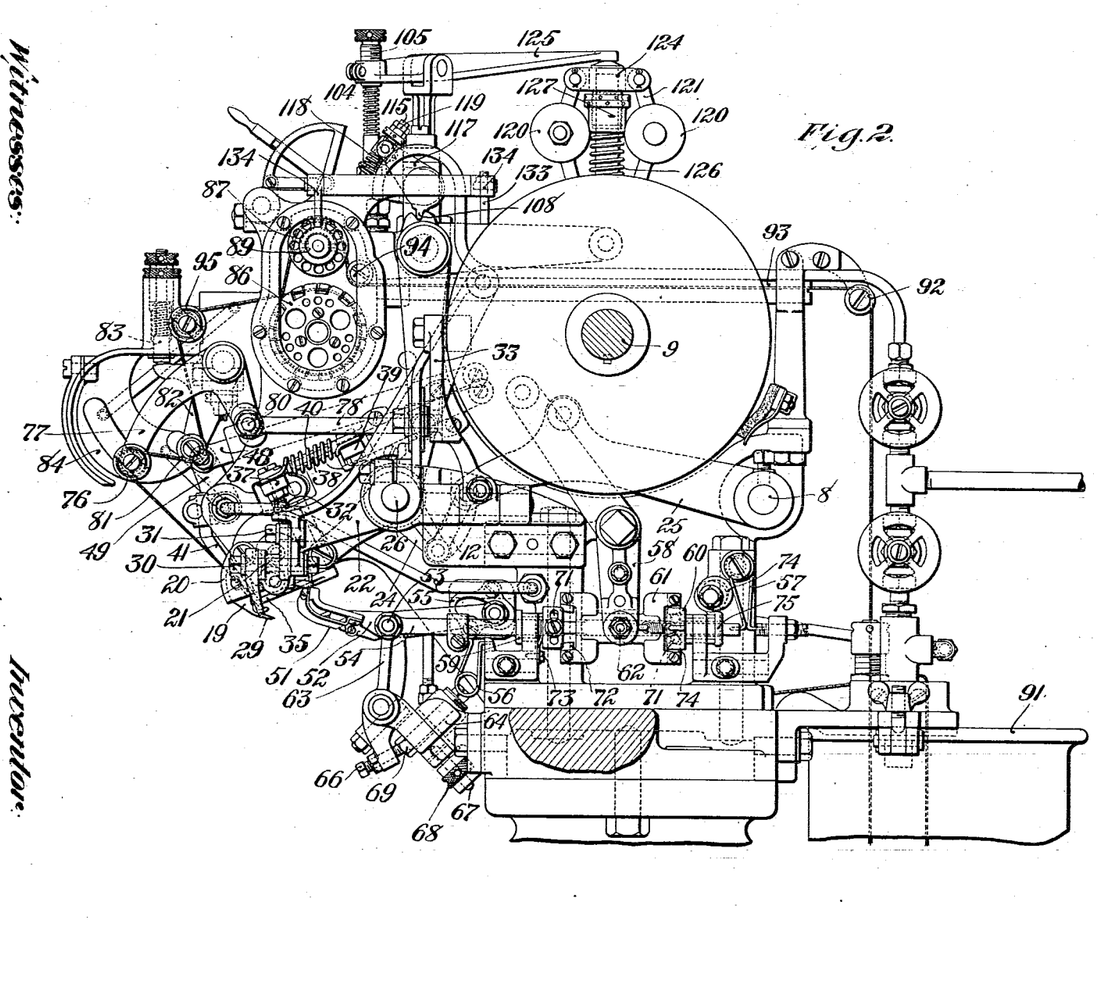
Fig. 2 is a side elevation partly in section of the machine illustrated in Fig. 1.

The tension devices of the machine illustrated in the drawings comprise a tension disk 86 around which the thread passes and which is provided with peripheral projections extending alternately in opposite directions from the disk. The disk is made of sheet metal and the projections are formed by slots extending into the disk for a short distance. The projections extending alternately in opposite directions provide at their bases a zigzag path for the thread so that the thread when seated at the base of the projections is held from slipping around the disk. As heretofore constructed, tension disks of this type have been provided with radial slots. The disk illustrated in the drawings is an improvement on the old form of disk in that the slots which extend inwardly from the periphery of the disk are inclined to the radial lines of the disks so that the projections formed by the slots are also inclined to the radial lines of the disk. With this form of tension disk, the thread draws down to the base of the projections more readily so that a very slight tension on the thread causes the thread to be securely gripped by the disk. Also with this form of disk the thread more readily frees itself from the disk in passing to the take-up. This will be apparent from an inspection of Fig. 2. To cause the thread to be drawn down into the passageway formed by the projections of the disk 86 at the beginning of the sewing operation, an auxiliary tension disk 87 is provided located above the disk 86. The face of the disk 87 is engaged by a friction washer 88 which is pressed against the disk 87 by means of a sleeve 89 surrounding the stud on which the disk 87 is mounted and acted upon by an adjustable coiled spring 90. The thread passes into the machine from the wax pot 91 of any suitable construction over a thread guide 92, through a tube 93, under a guide 94, over the tension truck 87, around the tension disk 86, over a guide roll 95, under the auxiliary take-up 81, over the main take-up 76, through the looper 41 to the work. The provision of the auxiliary tension truck 87 causes the thread to be tightly engaged by the tension disk 86 as soon as any strain is exerted upon the thread so that the thread is at once prevented from slipping around the tension disk 86 and the stitches at the beginning of a seam are sewn under full tension.

The tension disk 86 is rigidly secured to a short shaft to which is also secured a friction disk or drum 96. Coöperating with the drum 96 are two brake shoes 97 and 98, which are actuated to retard the rotation of the tension disk 86 by mechanism similar to that disclosed in applicant's prior application hereinbefore referred to. This mechanism comprises a lever 99, two levers 100 and 101, provided with adjustable abutments bearing on the upper surface of the lever 99, a bar 102 (see Fig. 1) pivotally connected to the lever 101 and resting on the lever 100, a rod 103 engaging the bar 102, a spring 104 acting on the rod 103, an adjustable abutment sleeve 105 engaging the upper end of the spring 104, an arm 106 engaging the lever 101, a rock shaft 107 to which the arm 106 is secured and a tooth 108 secured to the rock shaft 107 and engaging a correspondingly shaped recess in the hub of the cam actuated bell crank 79 from which the take-up is operated.

The parts above enumerated operate in the same manner as the corresponding parts of the mechanism disclosed in applicant's pending application to so control the rotation of the tension disk 86 as to produce a comparatively light tension on the thread during the loop drawing stroke of the needle and a comparatively heavy tension during the stitch setting stroke of the take-up.

The parts above enumerated are the same in construction and arrangement as the corresponding parts of the mechanism disclosed in applicant's pending application with the exception of the brake shoes 97 and 98 which in the present construction are arranged to engage diametrically opposite portions of the friction drum 96. The lower brake shoe 98 is supported at its front end from the frame of the machine by a link 109, the rear end of the brake shoe 98 is connected by a link 110, to the rear end of the brake shoe 97, and the forward end of the brake shoe 97 is connected by a link 111 to the lever 99. By arranging the brake shoes in this manner they act in opposition to each other and effectually retard the rotation of the drum 96 and tension disk 86 without exerting any objectionable pressure on the shaft carrying the drum and disk.

In addition to the mechanism above described for controlling the rotation of the tension disk 86, the machine illustrated in the drawings is also provided with means for locking the disk from rotation when the take-up reaches the limit of its upward stroke, and thereby preventing any possibility of an overthrow of the tension disk at the end of the pulling off operation. Any overthrow of the tension disk is highly objectionable as thereby the thread between the tension disk and the work is slackened and either a loose seam is produced or the operation of the thread handling devices is interfered with and the machine skips stitches. By locking the tension disk against rotation at the end of the upward movement of the take-up the machine can be run at a very high rate of speed without any liability of the thread handling devices, and particularly the thread arm and looper, failing to manipulate the thread in the proper manner, in the construction illustrated in the drawings, the means for locking the tension disk against rotation comprises a band brake 112 surrounding the friction drum 96. One end of the band brake 112 is connected to the frame of the machine at 113 and the other end is provided with a shoulder 114 which is engaged by the lower end of a rod 115. This rod at its upper end passes through a sleeve 116 clamped in the end of an arm 117. A spring 118 surrounds the rod 115 and is interposed between a collar on the rod and the lower end of the sleeve 116. An oscillation of the arm 117 compresses the spring 118 and actuates the rod 115 to bring the band brake 112 into locking engagement with the drum 96. The rod 115 is moved in the opposite direction on the return movement of the arm 117 by the engagement of the upper end of the sleeve 116 with adjustable stop nuts 119 on the upper end of the rod. The arm 117 is fast upon the rock shaft 107 hereinbefore referred to and is provided with the tooth 108 which is engaged by the hub of the bell crank 79 which actuates the take-up.

The mechanism illustrated in the drawings for varying the tension on the thread when the speed of the machine varies comprises a governor constructed and arranged to operate in substantially the same manner as the governor of applicant's pending application. This governor comprises two weights 120 which are supported at the center joints of toggle levers 121 the lower ends of the toggle levers being pivotally connected to a collar 122 fast upon a vertical shaft 123 and the upper ends of the toggle levers being pivotally connected to a sleeve 124 mounted to slide longitudinally on the shaft 123. The shaft 123 is driven through bevel gears from the main shaft of the machine. The sleeve 124 engages the rear end of a lever 125 which carries at its front end the adjustable abutment sleeve 105 which bears against the upper end of the tension spring 104 hereinbefore referred to. In the construction illustrated in applicant's pending application the weights 120 are connected by coiled springs, the tendency of which is to draw the weights inwardly and raise the sleeve 124. In the construction illustrated in the drawings of the present invention, a spring 126 is provided which is coiled around the shaft 123. The lower end of this spring rests upon the collar 122 while the upper end is engaged by an adjustable nut 127 screw threaded upon the exterior of the sleeve 124. By means of this construction the tension of the spring 126 can be adjusted and thereby the amount of increase or decrease in the tension for any given variation in the speed of the machine can be adjusted as may be desired.

To relieve the thread of tension when the machine is stopped, the machine illustrated in the drawings is provided with a tension release mechanism which, when the cam shaft of the machine is rotated by hand in the reversed direction removes the brake shoes 97 and 98 from engagement with the friction drum 96 and also moves the sleeve 89 to relieve the disk 87 from frictional engagement with the washer 88. This tension release mechanism comprises a swinging link or arm 128 such as is commonly employed in tension release mechanisms adapted to be operated by a reversal in the direction of rotation of the main driving shaft. This link is pivotally connected to the lower end of a lever 129 which is provided with a projection 130 extending beneath a projection 131 on the lever 99. An actuation of the link 128 upon a reversal of rotation of the driving shaft moves the lever 129 in a direction to lift the lever 99 and remove the brake shoes 97 and 98 from engagement with the drum 96. An arm 132 projecting rearwardly from the lever 129 is connected by a rod 133 to the horizontal arm of the bell crank 134. The vertical arm of the bell crank 134 is pivotally connected to the sleeve 89 and the arrangement of the arm 132, rod 133 and bell crank 134 is such that when the lever 129 is moved to raise the lever 99 the bell crank 134 is actuated to move the sleeve 89 outwardly and relieve the pressure of the friction washer 88 against the tension truck 87.

The machine illustrated in the drawings is also provided with a simple and efficient mechanism for retracting the welt guide slide simultaneously with the release of the tension. This mechanism comprises a rod 135 pivotally connected at its upper end to the arm 132 of the lever 129 and at its lower end to an arm 136 projecting from the rock shaft 137. To the rock shaft 137 is secured an arm 138 which is connected by means of a rod 139 to an arm 140 projecting from the pivot pin to which the welt guide supporting arm 63 is secured. The lower end of the rod 139 passes through a hole in the arm 140 and is provided with nuts 141, which engage and actuate the arm 140 when the rod 139 is depressed. It will be obvious from an inspection of Figs. 3 and 4, that a depression of the rod 139 will swing the arm 63 in a direction to retract the welt guide slide. A spring 142 connected to the arm 138 (see Fig. 3) normally holds the rod 139 raised so as not to interfere with the operation of the welt guide slide while the machine is in operation.

The preferred embodiment of the several features of the present invention having been thus described, what is claimed is:—

1. A shoe sewing machine, having, in combination, stitch forming devices including a curved hook needle, a needle segment a needle actuating lever, a cam engaging said lever, connections between the actuating lever and the needle segment comprising a bell crank, a link connecting one arm of the bell crank and the needle segment, and a link connecting the other arm of the bell crank and the cam actuated lever, a lateral thrust bearing for the free end of the cam actuated lever and a lateral thrust bearing for the link connecting the cam actuated lever and the bell crank and for the arm of the bell crank to which the link is connected.

2. A shoe sewing machine, having, in combination, stitch forming devices including a curved hook needle, a needle segment, an awl, concentrically mounted levers for actuating the needle and awl, cams engaging said levers, connections between said levers and the needle and awl comprising concentrically mounted bell cranks, links connecting the bell cranks with the cam actuated levers and with the needle segment and awl, the links connecting the cam actuated levers and bell cranks being arranged in contact with each other, and lateral thrust bearings for said links.

3. A shoe sewing machine, having, in combination, stitch forming devices including a curved hook needle, a lever provided at one end with a channel guide, a cam engaging the other end of the lever to oscillate the lever, an awl mounted on the lever, mechanism for actuating the awl independently of the lever and means for moving the lever laterally to feed the work.

4. A shoe sewing machine, having, in combination, stitch forming devices including a curved hook needle, a needle segment, a lever provided at one end with a channel guide, a cam engaging the other end of the lever to oscillate the lever an awl mounted on the lever, mechanism for actuating the awl including a bell crank mounted concentrically with the lever, a link connecting the bell crank and awl, a cam actuated lever and a link connecting the cam actuated lever and bell crank, and means for moving the channel guide lever laterally to feed the work.

5. A shoe sewing machine, having, in combination, stitch forming devices including a curved hook needle, a channel guide carrier, a channel guide mounted thereon, an awl mounted on the channel guide carrier, means whereby the awl and channel guide can be adjusted simultaneously on the carrier and means by which the channel guide can be adjusted independently of the awl.

6. A shoe sewing machine, having, in combination, stitch forming devices including a curved hook needle, a looper, a thread arm, and mechanism for actuating the thread arm including means for allowing the thread arm to yield in case it meets with an obstruction.

7. A shoe sewing machine, having, in combination, stitch forming devices including a curved hook needle, a looper, a thread arm, a shaft to which the thread arm is secured, an arm also secured to said shaft, a yielding link connected with the arm, and a cam actuated slide connected to the link.

8. A shoe sewing machine, having, in combination, stitch forming devices including a curved hook needle, an awl, a laterally movable carrier on which the awl is mounted, a bell crank mounted on the carrier to move laterally therewith, a link connecting the bell crank and awl, a cam actuated lever, a link connecting the cam actuated lever and bell crank, and lateral thrust bearings for said link.

9. A shoe sewing machine, having, in combination, stitch forming devices including a curved hook needle, a needle segment, a channel guide lever provided at one end with a channel guide, a cam engaging the other end of the lever to oscillate the lever, an awl mounted on the channel guide lever, means for moving the lever laterally to feed the work, a bell crank mounted concentrically with the lever and movable laterally therewith, a second bell crank mounted concentrically with said lever, links connecting the bell cranks with the awl and needle respectively, cam actuated levers, and links connecting the levers and bell cranks.

WILLIAM C. MEYER.

Witnesses:
FRED O. FISH,
WARREN G. OGDEN.

Copies of this patent may be obtained for five cents each, by addressing the "Commissioner of Patents, Washington, D. C."